(12) United States Patent
Bottomley

(10) Patent No.: US 7,909,752 B2
(45) Date of Patent: Mar. 22, 2011

(54) BEHAVIOUR MODIFICATION

(75) Inventor: Paul Bottomley, Old Basing (GB)

(73) Assignee: Can-Do Corporation Limited, Port Louis (MU)

( * ) Notice: Subject to any disclaimer, the term of this patent is extended or adjusted under 35 U.S.C. 154(b) by 763 days.

(21) Appl. No.: 11/575,699

(22) PCT Filed: Sep. 21, 2005

(86) PCT No.: PCT/GB2005/003630
§ 371 (c)(1),
(2), (4) Date: Jun. 22, 2007

(87) PCT Pub. No.: WO2006/032875
PCT Pub. Date: Mar. 30, 2006

(65) Prior Publication Data
US 2007/0265684 A1    Nov. 15, 2007

(30) Foreign Application Priority Data
Sep. 21, 2004  (GB) .................................. 0420924.3

(51) Int. Cl.
*A61M 21/00*    (2006.01)
(52) U.S. Cl. ........................................................ 600/26
(58) Field of Classification Search .................. 382/131; 434/236; 607/58; 600/522, 459, 26–29; 345/419
See application file for complete search history.

(56) References Cited

U.S. PATENT DOCUMENTS

| | | | | |
|---|---|---|---|---|
| 5,304,211 A * | 4/1994 | Israel et al. | ..................... | 607/58 |
| 5,725,472 A | 3/1998 | Weathers et al. | | |
| 5,823,932 A * | 10/1998 | Speigel | ......................... | 600/26 |
| 5,853,005 A * | 12/1998 | Scanlon | ........................ | 600/459 |
| 6,057,846 A * | 5/2000 | Sever, Jr. | ....................... | 345/419 |
| 6,996,261 B2 * | 2/2006 | deCharms | .................... | 382/131 |

FOREIGN PATENT DOCUMENTS

DE    10254051    6/2004

* cited by examiner

*Primary Examiner* — George Manuel
*Assistant Examiner* — Robert N Wieland
(74) *Attorney, Agent, or Firm* — Chernoff, Vilhauer, McClung & Stenzel

(57) ABSTRACT

The use of stimuli in order to create association between training regimes subconsciously is known. Unfortunately, in highly noisy and other polluted environments it is difficult to provide ongoing reinforcement of previous behavior modification and training. By providing a stimulus phrase which comprises two or more stimuli in known combinations it is possible to provide keyed association with previous training regimes.

18 Claims, 2 Drawing Sheets

BEHAVIOUR MODIFICATION

This is a national stage application filed under 35 USC 371 based on International Application No. PCT/GB2005/003630 filed Sep. 21, 2005, and claims priority under 35 USC 119 of United Kingdom Patent Application No. 0420924.3 filed Sep. 21, 2004.

The present invention relates to behaviour modification and the like in human subjects and particularly but not exclusively to such modification with respect to encouragement and reinforcement of lifestyle and performance enhancement.

It is known to combine performance enhancement and lifestyle improvement training with physical anchors such as audible noises or vibration such that as required an individual is prompted to recall their earlier training in order to avoid temptation, or deviate from the desired behaviour, or simply to provide cyclic recall of that behaviour for reinforcement or progressive reinforcement. International patent application no. PCT/GB97/01898 and UK Patent no. 2370233 both illustrate such approaches to behaviour modification. In short the process can be considered as the use of an external stimulus to trigger previously learnt appropriate responses to suggestions, actions and other stimuli. Thus, for example, a smoker trying to quit could undertake a self help course, and the positive message would become associated with an external stimulus such that during cravings the stimulus can be repeated helping the smoker to recall the positive reasons for not smoking and, or, the negative reasons for continuing smoking.

It will be understood that the processes for training or therapy are generally well thought out by qualified individuals in order to provide the necessary aversion, or yearning for a healthy lifestyle, or other training such as described above with respect to stopping smoking. Throughout the therapy a signal demand to operate the regime must be generated whereby the user then subconsciously associates the stimulus with the particular training or therapy and the positive results gained from it. This generation of the stimulus may be automatic, or specifically induced by the user, in order to, as indicated, either repetitively reinforce the training or therapy or to enhance a recall of that training or therapy, and its potential gains, during times of craving or weakness. Clearly, the combination of therapy/training and stimulus will be chosen by the therapist and user in order to achieve the best response. As indicated, the association between the training and stimulus may be automatic, manual or determined through some control feedback mechanism such as the individual's breathing, temperature or heart rate. Furthermore, it will be appreciated that during early stages of the training or therapy the number of stimuli provided as a trigger to recall the training or therapy regime will tend to be more regular and frequent than towards the end of the therapy or training period when stimuli may be manually activated by the user, when required.

Clearly, the number of stimuli available is limited. Furthermore, these stimuli must be distinct. If the stimulus was a simple buzzer it will be understood that the individual may, on every occasion they hear a doorbell, be caused to recall the training. In certain circumstances this may be beneficial, but in others may, if experienced by the user, as a polluting background chatter lead to detrimental subsonsciousness desensitizing. Previous techniques to avoid these problems have included use of normal CD players and hand fobs such that the signal can be generated outside the normal human audio range but still be acceptable for recall of the training or therapy and its potential gains. The stimulus may be recorded as a discreet but hidden element within a specific jingle or music played through conventional CD equipment or otherwise. Understandably, users may not want to wear their headphones or other equipment all the time, so there may be a time delay between the stimulus required and the actual provision of that stimulus to the individual to recall the training or therapy, and its potential gains. One alternative is to provide built-in means within a conventional device in order to provide the stimulus. Thus, a watch could incorporate a vibration device to enable an individual to receive a desired stimulus through that device, whilst for the remainder of the time the watch operates as per normal. Ideally more individual specific means for providing the stimulus are desirable.

In accordance with the present invention an apparatus is provided for behaviour modification comprising training means to provide training with respect to behaviour modification, stimulus means to provide the association with a training means and stimulus generating means to generate a stimulus post presentation of the training means, the stimulus generating means comprising a stimulus phase to provide a substantial environmentally distinct trigger for an individual to recall their training or therapy, and its potential gains.

Typically, the stimulus phase comprises at least two stimuli in time-spaced-apart relationship to each other to provide a distinct trigger. Alternatively, the stimulus phase comprises at least two stimuli arranged to overlap or overlay each other in order to provide a distinct trigger. Generally, the stimulus will be of the same type. Alternatively, the stimuli will be of different types.

Typically, the apparatus allows an individual user to choose his or her own stimulus phase.

Generally, more than one stimulus phase may be provided for respective parts of the training or therapy. Generally, the training or therapy comprises a plurality of lessons, and each lesson has its own stimulus phase.

Generally, the stimuli utilised in the stimulus phase are auditory, visual, tactile, olfactory or gustatory, i.e. anything which reacts with one or several human senses.

Normally, the stimulus generating means comprises time means to periodically provide the stimulus phase.

Advantageously, the stimulus generating means comprises manual means to produce the stimulus phase manually when a user so requires.

Typically, the stimulus generating means comprises means to sense a condition within an individual user in order to determine when to provide the stimulus phase.

Embodiments of the present invention will now be described by way of example only with reference to the accompanying drawings in which.

Figure 1:
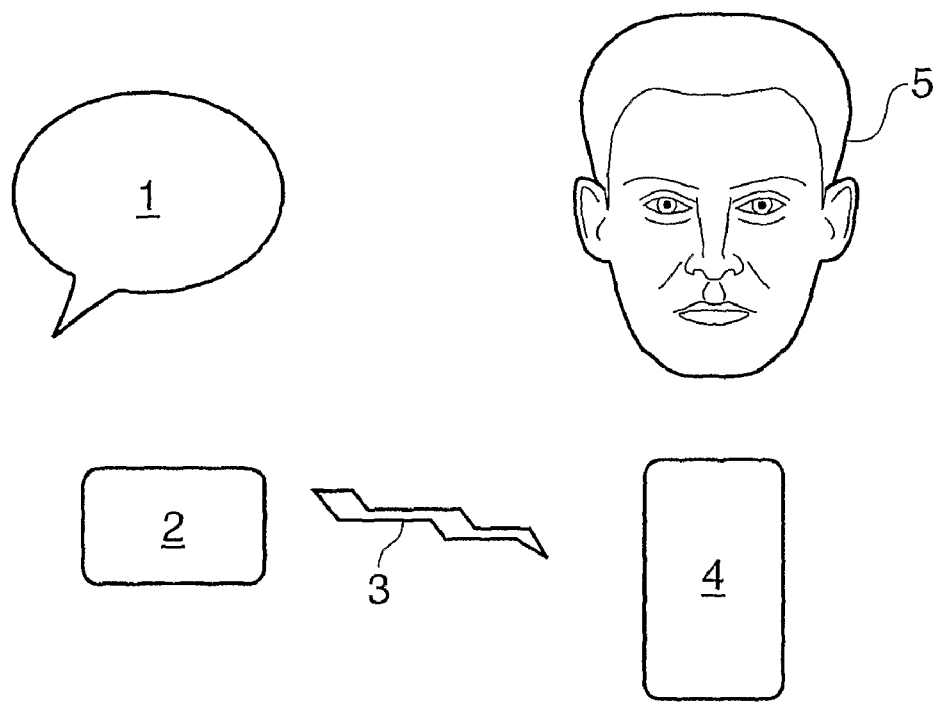
FIG. 1 is a schematic illustration of a first behaviour modification system.

As indicated above a system is known to provide a combination of training or therapy in order to provide for behaviour modification and/or performance improvement. These behaviour modifications and performance improvements may relate to giving up smoking or dieting or possibly an improved golf swing. Essentially an association process is used whereby achievement of the desired behaviour modification or lifestyle improvement is marked by the stimulus in a unique manner such that the individual receiving the training or therapy will then associate that modification or improvement with the particular stimulus. As indicated above, UK patent no. 2370233 and International patent application no. PCT/GB97/01898 provide examples of previous approaches to therapy and training for behaviour modification and performance improvement.

People lead busy lives and therefore require any reminiscent stimuli in the most convenient manner possible. In many circumstances the general noise background may pollute the perceptiveness of the stimulus, and in any event it will be understood that in public places it will be desirable to provide the individual with the stimulus without disturbing neighbours both generally, and, with respect to those neighbours providing stimuli for their own therapy and training regimes which are possibly being undertaken by them. Alternatively, in some circumstances it may be desirable to provide a stimulus to a whole group such as those undergoing stress management when situations of stress are detected, e.g. an emergency operations room during the middle of a crisis.

Clearly, the stimulus can be anything that reacts with one or several human senses in order that the stimulus is noticeable to that human individual. It is originality that provides the basis in accordance with the principles of the present invention for achieving acceptable operation of an apparatus incorporating association with a stimulus. What is necessary is provision of a substantially distinct stimulus phase to the user. This stimulus phase can be formed from a single stimulus, provided it is unique, but is more normally a combination of two or more stimuli.

A single stimulus may take the form of a unique noise or a scent appropriately presented to that individual. A noise may be a peculiar musical note form or sound. Thus, for example, an exotic animal call, untypical in the locality of the individual, may be used. Alternatively, a peculiar smell may be presented to the individual, specifically directed towards their nose, or any other humanly perceptible stimulus may be used including a tactile one, e.g. a pin prick or electrical charge may be used. Nevertheless, it will be understood that acceptable single stimuli may be difficult to find, such that there is a unique distinctiveness for a particular training regime or therapy identifiable to the individual as well as clearly separable from environmental background noise, and non-intrusive with respect to the individual's neighbours.

Normally, two or more stimuli are combined in order to provide a stimulus phase. These stimuli may be of the same type or a combination of different stimuli. Furthermore, the stimuli may be presented at distinct time spacings to add further uniqueness with respect to the stimulus phase or arranged to fully or partially overlap each other in order to create a unique or readily distinctive stimulus phase for association with the training or therapy, in accordance with the desired behaviour modification.

Stimuli of the same type used to form the stimulus phase may be a noise, or a combination of chemicals, to produce a unique scent. Thus, for example, a first noise may be followed in a time span of two seconds by a second noise such that a unique combination is therefore provided which is more distinguishable from the environmental background noise. A similar approach can be taken with regard to picking up a signal within a broadcast or played recording during a training regime, or therapy lesson or session. In such circumstances a device looks for a complete signal cycle in a broadcast or recording in order to create the necessary stimulus phase. If the device hears part of a signal it will then listen to receive the remainder of the signal before providing the stimulus. In such circumstances a broadcast device will repeat the signal to stimulate the means for generating the stimulus phase repeatedly until received by the means for generating the stimulus, and in any event, increasing the chances of the means for generating the stimulus receiving the necessary signal despite background noises. It will also be understood by an interaction between the broadcast device and the means for generating the stimulus signal to the user that, a form of calibration with respect to the background noise can be achieved. Alternatively, it is possible to listen for silences rather than noise within a training program in order to reduce the need for sophisticated electronics or high quality microphones and associated equipment. Nevertheless, means for identifying the stimulus within the recorded message if that is used as a means by which the training or therapy is undertaken by the individual can either simply be a trigger within that recorded message in order to cause some other device to provide a different or additional stimulus to the individual or itself be of a stimulus form recalled by the individual if a noise or a noise combination. In any event it is providing a stimulus phase of some form whereby it can be recognised by an individual, which is a principal requirement.

It is important to ensure a signal is received even in difficult environmental conditions. It will be appreciated if a signal for a stimulus (characterised jingle) is received and then the secondary stimulus (scent) is not received then essentially there is a break in the user recognition or connection with the underlying therapy or training. Thus, it is advisable to use back up or feedback techniques to ensure all elements of the stimulus phase are received. A control system may look for any two trigger signals whereby if it picks up part of a signal it will trigger the stimulus phase if it receives another part of the trigger signal in the next few seconds. In such circumstances it is not necessary to receive a full trigger signal but just distinct parts of trigger signals. In such circumstances it is possible to transmit several trigger signals one after the other and the system only has to pick up partial signals to operate the stimulus phase, but by looking for multiple signals is unlikely to operate accidentally. As an alternative to using feedback, it is possible if a receiver thinks it hears a trigger signal it can then interrogate a source of the trigger signals in order to stimulate an appropriate reply response within a certain time in order to confirm and trigger operation and release of the stimulus phase. Thus for example, if a device for emitting the stimulus phase were to receive a number of partial signals but receive no confirmatory reply response then it may be suggested that the user find a quieter situation where the trigger signals can be more readily received or moved closer to the source of the trigger signals.

The stimulus phase must have some originality. Thus, as indicated, two audible signals in a time spaced relationship or a sound and a scent combined again in a spaced relationship may provide the necessary stimulus phase to enable a user to recall previous training or therapy lessons or events, or the potential gains thereof. Furthermore, by providing two stimulus signals there is a degree of back up if one fails, e.g. the wind blows the scent signal away from the user. Furthermore, subconsciously there is a trigger by first using a noise or light signal, which causes the user to inhale more deeply, thus optimising the stimulus effects of a scent.

As an alternative, a combination of stimuli, either fully overlaying or partially overlapping each other, may be used in order to provide the stimulus phase. In such circumstances a noise may be combined with a slightly preceding, simultaneous, or slightly delayed, release of a scent stimulus. The audible noise will reinforce the expectation of receiving the sense stimulus, or vice versa, so further triggering greater association with the training or therapy regime. It will also be understood that two odours may be mixed in order to create an optimised scent stimulus phase for better, environmentally distinct, stimulus to the individual for association with the training or therapy lesson or potential gains thereof.

In any event, the stimulus phase should create a clear association with the training or therapy or the potential gains thereof. It should also be understood to provide distinct stimulus, with the action of the stimulus phase being transient and momentary to the user, such that it does not linger and become a general scent pollution or continuous stimulus to the user. Finally, the stimulus phase should be distinct and unmistakeable such that no confusing memories or associations are activated.

The present apparatus has particular applicability to a wide range of therapy and training regimes. The fixing of the association between the training regime and the stimulus phase is essential in order to provide the continuing ongoing reinforcement of the regime. The present invention has particular applicability with respect to so called self help training or therapy regimes, wherein a CD or training booklet is provided for home study by an individual. Nevertheless, a therapist or trainer may through use of a manually operated stimulator, during the course of a training or therapy session, achieve association within an individual or a group of individuals with respect to that particular part of the session. In any event, a training session incorporating stimulus phase association will be followed by a period during which the stimulus phase alone is provided at appropriate times. As indicated previously, the manner in which the stimulus phase is provided to the individual will be dependent upon particular environmental conditions. However, the actual timing of such stimulus phase action will be adjusted in accordance with particular individuals' requirements. Thus, a user may receive some help from a trainer or therapist and then be left with literature and a CD for further reinforcement of the training or therapy. The stimulus phase may be provided by playing a CD. The CD may stimulate, or through simple time of spacing, or manual initiation, or through sensing a particular status within the individual, e.g. anxiety through heart beat or blood pressure, breathing rate or temperature as required, offer the individual further reinforcement of the therapy or training.

By providing an individual with environmentally distinct stimulus phase it will be appreciated that the present apparatus allows a greater degree of interactivity for the particular individual. Thus, within a group training or therapy session it will be appreciated that different people will learn or react differently. Furthermore, a group of people may not all work or socialise together or not even within a family, or live together, such that use of a common stimulus phase for all members of that group may be inconvenient. By creating a degree of uniqueness with respect to the stimulus phase in accordance with the present invention, each individual may receive the stimulus phase in a distinct manner from other members of the group when and as required. In such circumstances, a stimulus phase for the group may be defined, and then an individual stimulus phase be provided for each individual member of that group, whereby, selectively, the whole group can be reminded as to the training or therapy or the potential gains or individual members of that group or subgroups appropriately reminded.

The apparatus, in accordance with the present invention to provide for behaviour modification, may incorporate both passive as well as active forms of training or therapy. As indicated, apart from use by an actual trainer or therapist the present apparatus is particularly applicable to so called self help learning techniques. These self help learning techniques generally comprise a recorded program, listing actions, as well as supporting literature. In a passive regime this recording is a monologue with respect to reciting the training or therapy with, normally, reference to the literature and, in accordance with the present invention, emission of the appropriate stimulus phase at the various stages throughout the recording in order to provide a more physiological anchor, reminiscent of particular passages or statements within the training regime. In such circumstances the initial training or therapy stages are anchored at fixed points by the emission of the stimulus phase and then subsequently recalled as indicated previously by a device such as headphones or means for emitting a scent or otherwise at appropriate stages in order to remind the individual as to their training or therapy regime.

In an active training or therapy regime generally a computer program is provided through which the participant individual undergoes the regime with a degree of interaction with the apparatus or trainer. Therefore, the actual positioning of the stimulus phases within the training regime may be adjusted dependent upon the interaction with the individual, that is to say to responses by that individual to questions or other situations within the training or therapy regime. Nevertheless, these stimulus phases still, as indicated previously will be configured to be distinct to an individual or closely defined group, and so, in accordance with the regime, provide an association for greater recall and enforcement of the therapy/training with that individual.

Additionally, with regard to an active training or therapy regime in accordance with self help principles, it will be understood that the individuals themselves may choose between different forms of stimuli thus creating their own distinct stimulus phases for the training or therapy regime. By such an approach the individual may pick a particular stimulus phase most appropriate for that individual's environment and expectations.

It will be appreciated that the stimuli utilised with respect to the present invention can be delivered in a number of systems. The drawings illustrate four exemplary systems but others may be used.

FIG. 1 illustrates a first manual, behaviour modification system in which a stimulation device 4 is activated by a fob 2 which emits an RF signal 3 when a fob 2 button is pressed. The RF signal 3 is picked up by the device 4.

A therapist or trainer 1 speaks directly to a user 5. When it is time to activate the secondary stimulation, in this case the device 4 the fob 2 is manually activated and a signal 3 is transmitted. Alternatively, the system may be a self-help regime where a CD message is played with prompts to manually activate the fob 2.

The signal 3 can take many forms including radio waves, infra red or sound. Of note is a similar scenario where the trainer is communicating by a phone or similar and the signal is transmitted also via a phone network.

Figure 2:
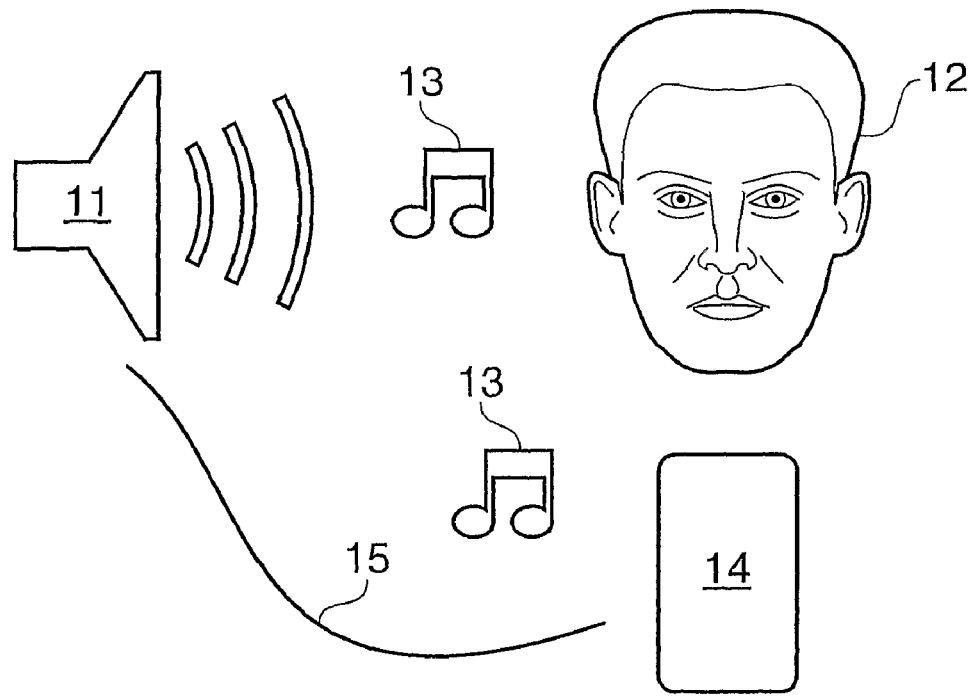
FIG. 2 is a schematic illustration of a second behaviour modification system.

FIG. 2 illustrates a second, audio, behaviour modification system in accordance with a standard player device such as a CD player 11, broadcasts a lesson. Within this lesson there is a trigger signal 13 which could be in the form of a jingle, which is heard by a user 12. Similarly this trigger signal 13 can be 'heard' by the stimulator device 14, or by a device such as a fob (see FIG. 1). This will cause the device 14 to activate (in the case of a fob via RF). Alternatively a wire 15 could run from the output socket on the CD player 11. This would reduce the effects of environmental pollution, passing the signal to headphones on the user and/or directly to the device 14 or a trigger device (fob).

Figure 3:
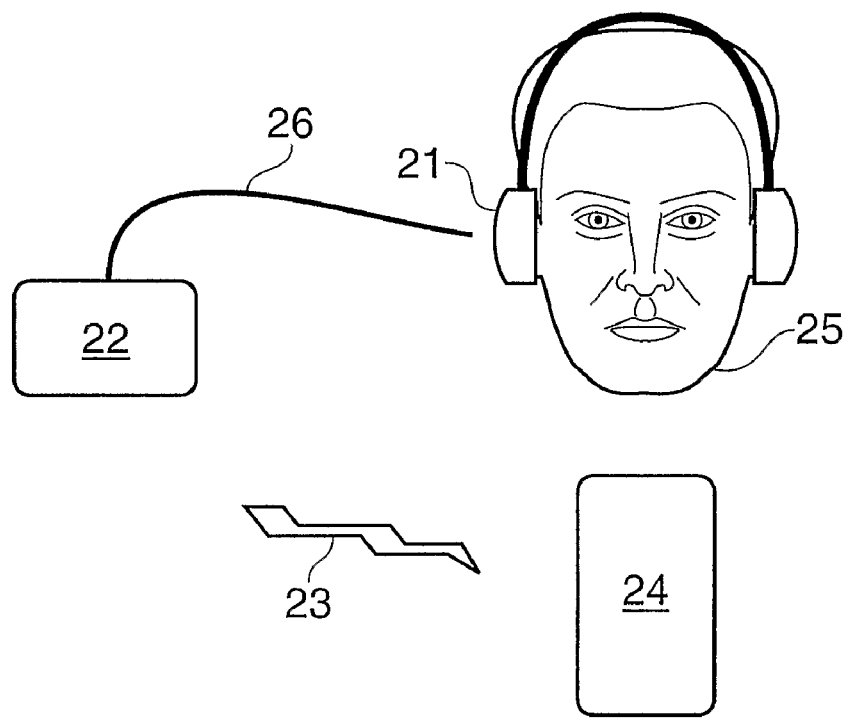
FIG. 3 is a schematic illustration of a third behaviour modification system; and, FIG. 4 is a schematic illustration of a fourth behaviour modification system.

FIG. 3 illustrates a third integral behaviour modification system in accordance with the present invention. A player device 22 contains the means for playing a recorded message.

A user 25 could wear headphones 21. The player device 22 replaces a CD player and the fob from the systems above. The device 22 could be an MP3 player or any similar device that can store and broadcast sound/vision information to the user 25. However at the appropriate parts in the broadcast message the device 22 transmits a signal 23 to a stimulator device 24. Again this signal 23 can take many forms, including a radio frequency. The device 22 is also likely to have a manual operation button, enabling it to be used like a simple fob (see FIG. 1).

It is also of note that the player device 22 could be a home PC or any electrical device capable of being programmed and sending a signal. This includes modern mobile phones. Finally, the headphones 21 could be coupled to the player device 22 by a fixed wire 26 or any wireless link.

As indicated above the present behaviour modification apparatus may be auto-activated by response to a pre-recorded audio stimulus or other training regime as a CD or tape or by sensed regime from an individual when reinforcement is required. The stimulus may be triggered by signals in the recorded message.

Figure 4:
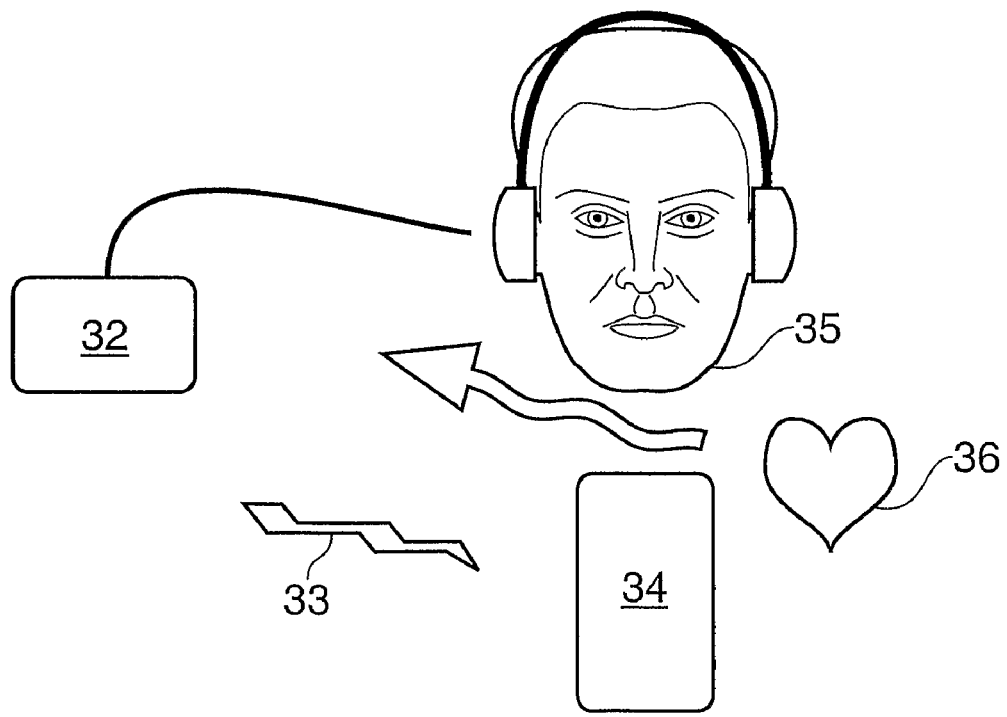

FIG. 4 illustrates a fourth, feedback behaviour modification system in accordance with the present invention. A connection, whether wire or wireless between a fob 32 and the stimulator device 34 is two-way. Thus, bodily information from a user 35 can be transmitted back to the fob 32 and the message playing modes (speed/repetition etc) can be adjusted as necessary and a signal 33 to activate the stimulus device 34 adjusted accordingly.

A secondary device 36, such as a heart beat or body temperature sensor monitors environmental or user attributes and feeds these back to the fob 32 as a control device. In this example the user's heart rate is broadcast and the stimulus phase adjusted accordingly.

As indicated above, the present invention is based upon creating environmentally distinct stimulus phases. Thus, these phases may combine an audio or visual stimulation created by a radio, TV, mobile phone, terrestrial phone, computer or player for cassette tapes, CD, MP3 or other programmable recall apparatus along with stimuli created by vibrators or olfactory stimulators, lights, crystals or temperature or otherwise. Communication between all parts of the equipment to create the distinct stimuli, in sequence, and so create the stimulus phase may be hard wired together or by use of wireless technology, such as radio frequency communication, or Blue Tooth, or infra red, or ultrasonic, or other means of coordinating stimuli emissions to a user.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus to deliver a stimulus phase for behaviour modification based upon therapy or training to achieve behaviour modification recalled by stimulus association with the training or therapy, the apparatus comprising a stimulus generating device to generate stimuli post presentation of the training or therapy, the stimuli providing an association with the training or therapy, the stimulus generating device having a plurality of stimuli types with at least two stimuli in time-spaced-apart relationship to each other to create a distinct trigger for an individual to recall the training or therapy, the at least two stimuli taken from the plurality of stimuli types within the stimulus generating device, the stimulus generating device making available a number of stimulus phases to an individual for different environments expected by an individual so one stimulus phase is adopted by an individual as the individual's distinct trigger in an environment expected by the individual, the stimuli arranged to provide at least part of the distinct trigger during association with the training sufficient for recall of the training or therapy.

2. An apparatus as claimed in claim 1 wherein the stimulus phase comprises at least two stimuli arranged to overlap or overlay each other in order to provide the distinct trigger.

3. An apparatus as claimed in claim 1 wherein the stimuli are of the same type.

4. An apparatus as claimed in claim 2 wherein the stimuli are of the same type.

5. An apparatus as claimed in claim 1 wherein the stimuli are of different types.

6. An apparatus as claimed in claim 2 wherein the stimuli are of different types.

7. An apparatus as claimed in claim 1 wherein the apparatus allows an individual user to choose their own stimulus phase.

8. An apparatus as claimed in claim 1 wherein more than one stimulus phase is provided for respective parts of the training or therapy.

9. An apparatus as claimed in claim 1 wherein the training or therapy comprises a plurality of lessons, and the apparatus is arranged to provide a respective stimulus phase for each lesson.

10. An apparatus as claimed in claim 1 wherein the stimuli utilised in the stimulus phase are auditory, visual, tactile, olfactory or gustatory.

11. An apparatus as claimed in claim 1 wherein the stimulus generating device includes a timer to periodically provide the stimulus phase.

12. An apparatus as claimed in claim 1 wherein the stimulus generating device includes a manual trigger to produce the stimulus phase manually.

13. An apparatus as claimed in claim 1 wherein the stimulus generating device includes a monitoring device to sense environmental conditions or a condition within an individual user in order to determine when to provide the stimulus phase.

14. An apparatus as claimed in claim 1 wherein the stimulus generating device is arranged to identify a trigger signal in a recorded message for stimulation of the stimulus generating device to provide the stimulus phase.

15. A method of behaviour modification comprising, providing a number of training or therapy steps, providing stimuli to provide an association with the training or therapy steps, assigning a stimulus phase to each training or therapy step for association, providing a stimulus generating device to provide stimulus generation, and arranging for stimulus generation at appropriate time intervals or occasion of the stimulus phase to cause association by that individual with the training or therapy step, the stimulus generating device generating stimuli post presentation of the training or therapy, the stimulus generating device having a plurality of stimuli types with at least two stimuli in time-spaced-apart relationship to each other to create a distinct trigger as a stimulus phase for an individual to recall the training or therapy step, the at least two stimuli taken from the plurality of stimuli types within the stimulus generating device, the stimulus generating device making available a number of stimulus phases to an individual for different environments expected by an individual so one stimulus phase is adopted by an individual as the individual's distinct trigger in an environment expected by the individual, the stimuli arranged to provide at least part of the distinct trigger during association with the training sufficient for recall of the training or therapy step.

16. A method as claimed in claim 15 wherein the stimulus phase comprises at least two stimuli arranged to overlap or overlay each other in order to provide a distinct trigger with respect to association with the training or therapy step or lesson.

17. A method as claimed in claim 15 wherein the method allows adjustment of the stimulus phases for unique identification by an individual user.

18. A method as claimed in claim 15 wherein the stimulus phase is formed by auditory and/or visual and/or tactile and/or olfactory and/or gustatory stimuli.

* * * * *